United States Patent [19]

Spear

[11] 4,278,370
[45] Jul. 14, 1981

[54] CUTTING TOOL

[75] Inventor: Gilmore M. Spear, Rochester, N.Y.

[73] Assignee: The Gleason Works, Rochester, N.Y.

[21] Appl. No.: 42,685

[22] Filed: May 25, 1979

[51] Int. Cl.³ .............................................. B26D 1/12
[52] U.S. Cl. ....................................... 407/115; 407/22
[58] Field of Search ................... 407/20, 22, 115, 116, 407/117, 120

[56] References Cited

U.S. PATENT DOCUMENTS

| | | | |
|---|---|---|---|
| 2,268,326 | 12/1941 | Stewart et al. | 407/22 |
| 2,814,166 | 11/1957 | Carlsen et al. | 51/33 |
| 2,978,792 | 4/1961 | Slayton | 407/22 |
| 3,052,951 | 9/1962 | Kubota | 407/120 |
| 3,146,551 | 9/1964 | Carlsen et al. | 51/34 |
| 3,520,041 | 7/1970 | Shephard | 407/115 |
| 4,060,881 | 12/1977 | Ryan | 407/22 |
| 4,093,391 | 6/1978 | Bachmann et al. | 407/22 |
| 4,137,001 | 1/1979 | Fountain | 407/115 |
| 4,197,038 | 4/1980 | Hipp et al. | 407/22 |

FOREIGN PATENT DOCUMENTS 2548482 5/1977 Fed. Rep. of Germany ............. 407/20
583874 12/1977 U.S.S.R. .................................. 407/120

OTHER PUBLICATIONS

Adamas–Advertisement of Adamas Carbide Corp.

Primary Examiner—Harrison L. Hinson
Attorney, Agent, or Firm—Morton A. Polster; Ralph E. Harper

[57] ABSTRACT

A gear cutting tool is provided with a chip breaking surface along its front face for breaking chip formations between a side and bottom of a tooth slot as the tool advances through the slot in a cutting operation.

4 Claims, 6 Drawing Figures

CUTTING TOOL

BACKGROUND AND BRIEF DESCRIPTION OF INVENTION

This invention relates to an improved cutting tool useful for cutting slots in workpieces and is more particularly concerned with an improved cutting tool for gear cutting applications.

It is known in the art of gear cutting to provide for cutting tools which can be easily resharpened by their users by simply regrinding a profile on a cutting end of each tool. The cutting face of such a tool does not require resharpening, and this permits a preservation of the cutting face for metallurgical or other types of treatments which improve cutting and wear characteristics of the tool. In addition, it is known to provide in cutting tools of this type a built-in side rake angle of the cutting face relative to the orientation of such tools in radial slots in cutterheads designed to carry a plurality of tools for gear cutting purposes. Built-in rake angles are disclosed, for example, in U.S. Pat. Nos. 4,060,881 (commonly owned herewith) and 4,137,001. The descriptions of U.S. Pat. No. 4,060,881 are incorporated herein by reference to the extent necessary to provide additional background information regarding the design and usage of certain cutting tools in bevel gear cutting applications. Similar type tools can be used in spur and helical gear cutting applications in which the tools are mounted in a carrier for being brought into engagement with a cylindrical workpiece for forming spur or helical gears.

In the use of tools of the type just described, it has been a practice to utilize three separate designs of tools in a single cutterhead for separately cutting the two sidewalls and the bottom portion of each tooth slot to be formed in a workpiece. Thus, an inside cutting blade is provided to cut one side of the tooth slot, an outside cutting blade is provided to cut an opposite side of the same tooth slot, and bottoming blade is provided for forming the bottom of the tooth slot in the workpiece. With this arrangement, three different designs of cutting blades are required, and three different sharpening set-ups are required for each resharpening of the cutting blades.

It has been found that the function of the bottoming blade can be combined with the two separate side cutting blades in certain completing operations in which a complete tooth slot is formed with a single set-up between tooling and workpiece. This has been accomplished by eliminating the bottoming blade and by providing a cutting edge on each side cutting blade which cuts a portion of the bottom of the tooth slot as well as a portion of one of the sides thereof. Thus, only two types of cutting tools are needed to perform the functions of the three separate tools previously used. In this way a greater number of tools can be provided in a given cutter for working the sides of the tooth slots being formed, and this provides for a faster completing action for the cutter.

However, it is known (as described in U.S. Pat. No. 2,268,326) that when a single cutting tool is required to cut portions of both a side and a bottom of a slot, there is a problem of wing-shaped chips forming along the cutting edge of the tool between the portion of the cutting edge which serves to cut the side of the slot and the portion of the cutting edge which serves to cut the bottom of the slot. These chips tend to compress together in the cutting zone, resulting in a heating up and adhering of the chips to the cutting tool. Chips which do not separate cleanly from the cutting tool can damage the tool, score the surface being cut, and increase drag during the cutting operation.

In order to eliminate these problems so as to produce a better surface finish and a more rapid cutting action, it is a primary purpose of this invention to provide for a chip breaking surface between the two parts of the tool cutting edge that are cutting the two separate parts of a slot in a workpiece. Chip breaking configurations have been used in the past, as shown in U.S. Pat. No. 2,978,792 (commonly owned herewith), for breaking up chips formed in a single part of a tooth slot. Those surfaces were formed on the profile of the cutting end of the tool. Other types of chip breaking surfaces have been provided adjacent to and parallel with the cutting edges of tools. In contrast, the chip breaking surface contemplated by the present invention is formed on the cutting face of the cutting tool and parallel to the axis of the tool, to thereby permit resharpening of the cutting tool profile without disturbing the front face and chip breaking feature of the tool. Additionally, the chip breaking surface of the present invention is positioned at a critical location between the part of the tool that is cutting the bottom of the slot and the part of the tool that is cutting a sidewall portion of the slot. Thus, the cutting tool of the present invention differs both structurally and functionally from what is known to be prior art.

In accordance with a preferred embodiment of the present invention, a gear cutting tool is provided with a chip breaking surface along its cutting face, and the cutting face of the tool is formed at a desired side rake angle for all or part of the length of the tool. Provision of the chip breaking surface on the cutting face provides a cutting edge having a first part for cutting at least a portion of a side of the tooth slot together with a second part for cutting at least a portion of the bottom of the tooth slot. The chipbreaking surface can be formed by grinding one part of the cutting face to a greater depth than its adjoining part to thereby provide offset surfaces for substantially the full length of the cutting face of the tool. This permits resharpening of the profile of the tool without regrinding the cutting face surfaces which have been formed. In addition, the surface which is ground to a greater depth also undercuts the other surface slightly so as to provide a slightly overlapping relationship between the parts of the cutting edge that are forming the separate parts of the tooth slot.

These and other features and advantages of the present invention will become apparent in the more detailed discussion which follows, and in that discussion reference will be made to the accompanying drawings as briefly described below.

DETAILED DESCRIPTION OF INVENTION

Figure 1:
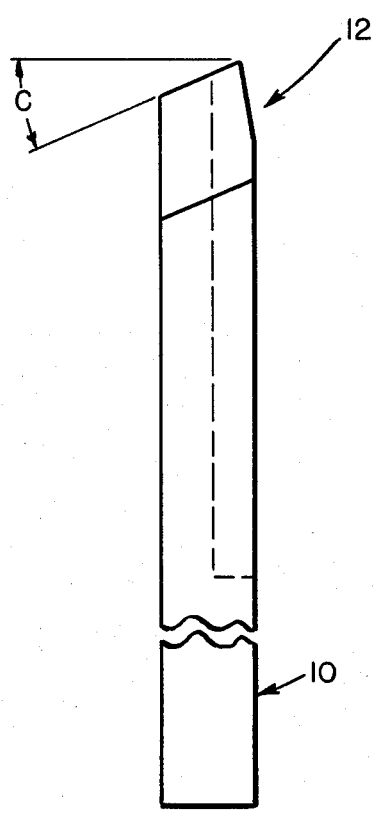
FIG. 1 is a side elevational view of a single cutting tool of the type contemplated by the present invention.
Figure 2:
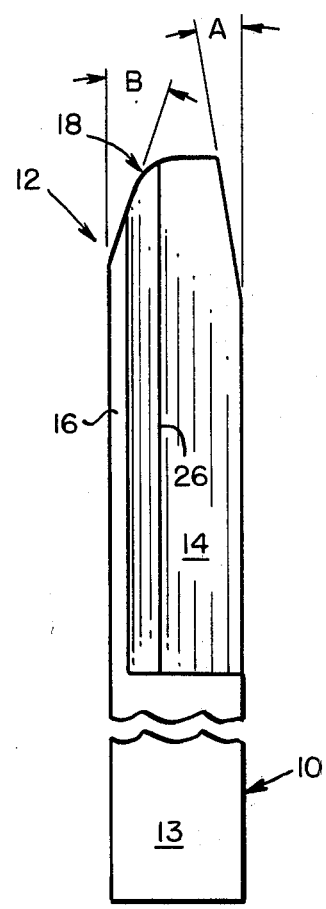
FIG. 2 is a front elevational view of the cutting tool of FIG. 1.
Figure 3:
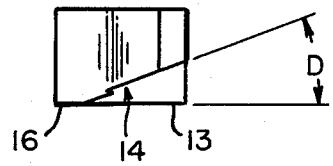
FIG. 3 is a top end view of the cutting tool depicted in FIGS. 1 and 2.

Referring to FIGS. 1-3, it can be seen that the cutting tool of this invention is of the type which can be formed from bar stock having a rectangular cross-sectional configuration. Each tool has a base end 10 and a cutting end 12. The cutting end 12 includes a profile (as shown in FIG. 2) for defining a clearance angle A and a pressure angle B. In addition, an end angle C (as shown in FIG. 1) is formed at the cutting end of the tool. This tool also includes a built-in side rake angle D (FIG. 3) which can be formed by grinding off a front wall 13 of the tool for whatever length is desired. This forms a cutting face (or chip face) 14 which extends down to the base portion 10 of the tool, and it can be seen that a narrow portion 16 of the front wall 13 of the tool is left unground for the purpose of positioning and clamping the tool within a radial slot of a cutterhead of the type shown, for example, in U.S. Pat. No. 4,060,881. This feature is also shown in that same patent. A cutting edge 18 of the illustrated tool is defined by the intersection of the cutting face 14 with the end of the tool that is ground off to develop the pressure angle B and the profile of the tool. The cutting edge extends along a radius that blends with the tip end of the cutting tool. The full extent of the cutting edge 18 can be appreciated from the FIG. 5 view in which there is depicted a first part 20 of the cutting edge for cutting the side of a slot in a workpiece and a second part 22 for cutting the bottom of a slot in a workpiece. Between the parts 20 and 22 is a radius 24 which provides a smooth profile for the development of a fillet between the sidewall and bottom portion of a tooth slot in a workpiece. Bracket 18' embraces the full extent of the cutting edge 18, as seen in the FIG. 5 orientation.

Figure 4:
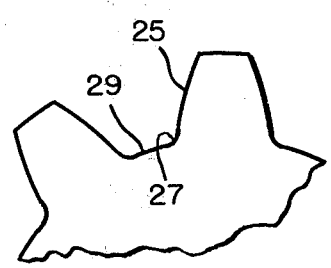
FIG. 4 is a view of a single face of a portion of a gear, showing a typical tooth slot profile that might be formed with the tools of the present invention.

FIG. 4 illustrates a sidewall 25, a fillet 27, and a bottom portion 29 of a typical tooth slot that might be formed with the tool of this invention.

Figure 6:
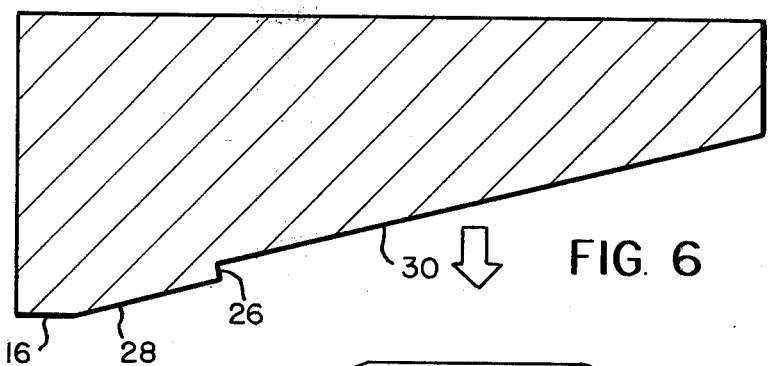
FIG. 6 is a cross-sectional view of the cutting tool shown in FIG. 5 as seen on line 6—6 thereof.
Figure 5:
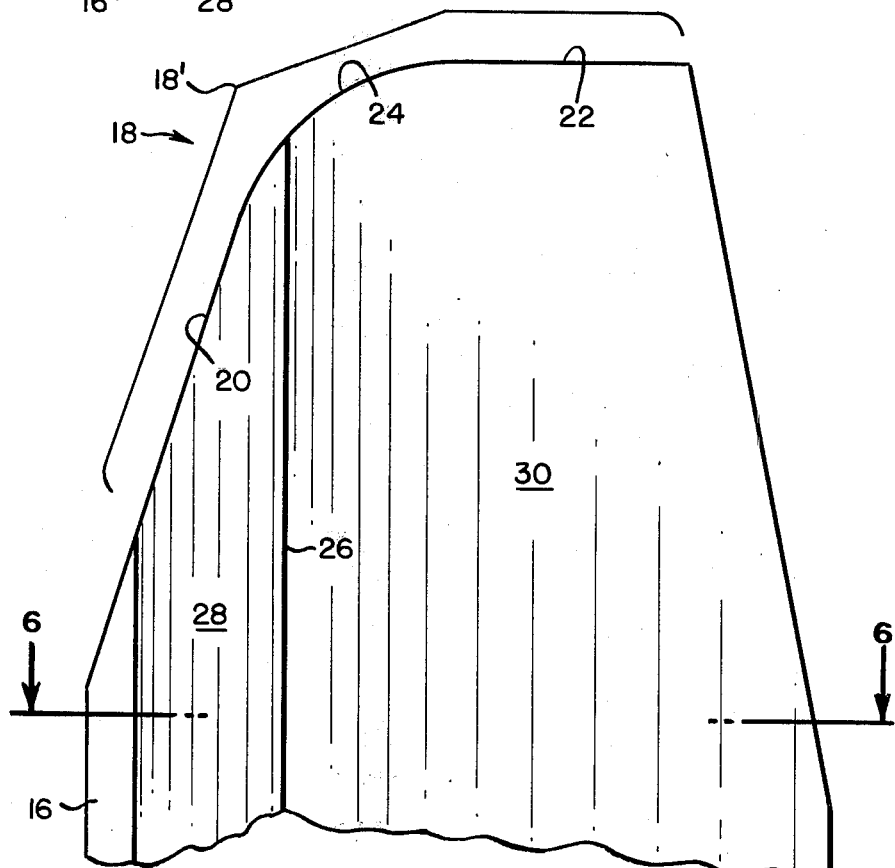
FIG. 5 is a greatly enlarged front elevational view of just the cutting end of the cutting tool of FIG. 2.

FIGS. 5 and 6 illustrate details of the present invention wherein a chip breaking surface 26 is formed between the first part 20 and the second part 22 of the cutting edge of the tool. This chip breaking surface 26 is formed axially along the entire length of the cutting face 14 of the tool and is formed by a relative displacement of a first part 28 of the cutting face relative to a second part 30 of the cutting face. This displacement can be provided by grinding the second part 30 of the cutting face in a plane parallel to the plane of the first part 28. Grinding of the second part 30 at a slightly greater depth than the first part 28 of the cutting face provides a leading position for the portion of the cutting edge which serves to cut the side of a slot in a workpiece relative to the portion of the cutting edge which serves to cut the bottom of the slot in the workpiece. Preferably, the amount of offset provided between the planes of the parts 28 and 30 is sufficient to accomodate the thickness of a chip (0.0001 inch, for example) being formed by the part of the cutting edge which is defined by the second part 30 of the tool. This leading position can be appreciated from the FIG. 6 view. In this manner, one part of the cutting edge is preceding the other in its track through a tooth slot and in its formation of a chip within the tooth slot. This provides for a separation of chips between the side and bottom of each slot and permits a movement of chips found by the trailing part of the tool to move behind chips formed by the leading part of the tool.

It can also be seen from the views of FIGS. 5 and 6 that the offset surfaces 28 and 30 of the cutting face of the tool are formed in such a way that the surface which is ground to a greater depth (surface 30 in the FIG. 5 embodiment) effectively undercuts the other surface slightly so as to provide an overlapping relationship between the first part 20 and the second part 22 of the cutting edge when viewed in the direction of movement of the tool through a slot (as depicted by the arrow in FIG. 6). This provides for a very clean and complete cutting action between the side and bottom portions of each tooth slot. The undercut relationship can be exagerrated by additional grinding, if desired.

As an example of a working embodiment of the cutting tool of this invention, tools having the following characteristics have been designed:

Material: High Speed Steel
Length: 4.025 inches
Width: 0.450 inches
Thickness: 0.380 inches
Angle A: 23°30′ to 10′
Angle B: 14°–28°30′
Angle C: 24°
Angle D: 19°36′
Radius 24: 0.050 inches Although this invention has been described with reference to a single embodiment, it can be appreciated that its principles can be applied to fully equivalent variations thereof. For example, it may be desirable to provide such a chip breaking surface on a cutting tool which requires resharpening of its front face as well as its profile or in lieu of its profile, and in such a case, the critical importance is one of providing for a chip breaking surface between the part of a cutting edge which is removing metal from the side of a slot and the separate part of the cutting edge which is removing metal from the bottom of a slot. Also, it is contemplated that certain cutting tools designed for simultaneously cutting both side walls as well as the bottom of a gear tooth slot can utilize the chip breaking feature of this invention at the separate corners of the tool which define the intersections of the side walls of the slot with its bottom. Such a tool might have two parallel chip breaking surfaces formed on a cutting face thereof. Likewise, tools designed for cutting just the bottoms of tooth slots could utilize parallel chip breaking surfaces intersecting the corners of the tool. The illustrated tools show a cutting face 14 which is ground into the tool for less than the full length thereof, and this is to provide a substantial base portion 10 that can be secured and clamped in a cutterhead body, however, it is possible to extend the built-in rake angle along the entire length of the tool, if desired. All such equivalent structures and variations are intended to be included within the scope of the claims as defined below.

What is claimed is:

1. In a gear cutting tool of the type formed from a length of bar stock having a generally rectangular cross-section and having a cutting face formed into a front wall portion of the bar stock at a desired rake angle for at least a part of the length of said tool, said tool further having a base end and a cutting end, said cutting end having a profile formed thereon for defining a cutting edge between said cutting face and one side of the tool, the improvement comprising a first part of said cutting edge serving to cut at least a portion of a side of a tooth slot of a gear, a second part of said cutting edge serving to cut at least a portion of a bottom of a tooth slot of a gear, and a chip breaking surface formed between said first and second parts of the cutting edge, said chip breaking surface being defined between parallel plane surfaces formed on the cutting face of the tool for substantially the full length of the cutting face so that the cutting end of the tool can be resharpened without disturbing the function of said chip breaking surface.

2. The improvement of claim 1 wherein said parallel plane surfaces are arranged with one such surface positioned at a greater depth than the other such surface.

3. The improvement of claim 2 wherein said one surface which is ground to a greater depth also undercuts said other surface slightly, when viewed in the direction of movement of the tool through a tooth slot of a gear, so as to provide an overlapping relationship between said first and second parts of said cutting edge.

4. The improvement of claim 2 wherein the said greater depth of one plane surface relative to the other plane surface is greater than the thickness of a chip to be produced by the cutting action of said tool.

* * * * *